Figure 1:
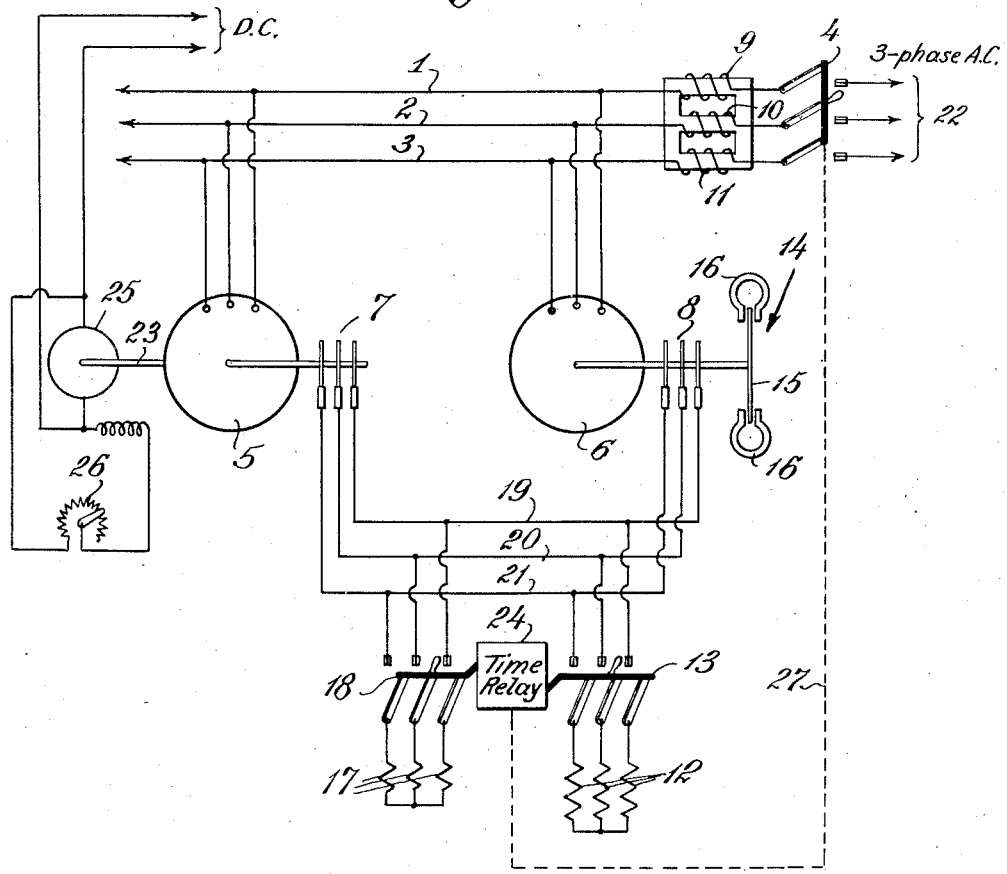

INVENTOR
J. U. F. Andersen
BY
Pennie, Davis, Marvin and Edmonds.
ATTORNEYS

Patented June 11, 1940

2,203,854

UNITED STATES PATENT OFFICE 2,203,854

SELF-SYNCHRONOUS CONTROL SYSTEM

Joakim Ulrik Frederik Andersen, Charlottenlund, near Copenhagen, Denmark, assignor to F. L. Smidth & Company, New York, N. Y., a corporation of New Jersey Application November 10, 1938, Serial No. 239,745
In Great Britain November 12, 1937

4 Claims. (Cl. 172—293)

This invention relates to electric self-synchronous control systems, and is more especially concerned with such systems wherein machines of the asynchronous wound-rotor type, frequently employed as induction motors, are so connected together as to operate synchronously. In particular the invention provides a control system whereby such a motor may readily be started and brought into step or synchronism with its related generator already running.

Machines of the type referred to may comprise primary or stator windings and secondary or rotor windings, the primary windings being connected in parallel to a common source of polyphase current, and the secondary windings being connected with each other. If the machines are similar, those employed as motors will operate in synchronism with the machine driven as a generator, and further, under proper conditions the rotors of the motors will reproduce the movements of the rotor of the generator.

It is known to use the so-called "Selsyn" system for synchronizing the speeds of motors driving two or more units, but systems of this type as used heretofore have had the rather objectionable disadvantage that all the units had to be started in unison. In other words, if one unit has to be shut down for a short period of time to permit repairs or adjustments, the unit with which it is to be in synchronism must be stopped momentarily and restarted with the first unit. Unless this is done, the unit which is controlled by the speed of the other cannot readily be brought into step and maintained in step.

Previous to my invention, such stopping and starting had to be resorted to, unless the drives were equipped with magnetic or hand operated clutches which would disconnect the respective units from their motors, thus permitting the motors to idle while the units themselves were stopped. The use of suitable couplings is not only expensive but complicates the drive.

Stopping and restarting, while not serious for smaller drives, do become very serious in connection with the larger units, such, for example, as those driving rotary kilns as used in cement plants, particularly as it is quite common to stop the slurry feeder or coal feeder for short periods of time to take care of the varying burning conditions in the kiln.

In practice, two methods have customarily been followed in starting up machines connected as outlined above.

By the first method, all the primary windings are disconnected and all the rotors are at rest, and the machines are started up by first connecting the primary windings to the source of electric power, and then driving the generator mechanically, in which case the motors accelerate in step with the generator. In this case it is a relatively simple matter to maintain the machines in synchronism.

However it is often necessary to run the motors up to speed when the generator is already running, particularly when several motors are being driven by the same generator and it is necessary to allow for them to be stopped and started independently. In this case, the primary windings of the motor or motors to be started are connected to the power supply when the generator is running at speed. This method of starting can be used also when the whole system is being started from rest, in which case, all the primary windings being disconnected, the rotor of the generator is first run up to speed by the mechanical drive and the motors then have to be brought into step by switching on the electric power supply to the primary windings. Thus, the motors are accelerated as asynchronous induction motors until their rotors pull into step with the rotor of the generator.

The present invention facilitates the starting and bringing into step of the machines operated especially in accordance with the method last above mentioned.

Such self-synchronous systems may be employed for many purposes in which it is desirable to have two or more rotating units moving entirely in step. In one application, the system may be used in connection with cement kilns in order to ensure that the amount of raw mix or slurry, or fuel for burning, fed to the kiln is always in a certain fixed ratio to the number of revolutions of the kiln. More specifically, the present invention is applicable to such a system in which the generator machine is coupled direct to the motor which rotates the kiln, while the motor of the system drives the feeding device for raw mix as, for example, is described and illustrated in U. S. Patent 1,903,070, granted March 28, 1933.

When this invention is employed in such a system, the two or more electrical machines are maintained in step or synchronism in the sense that not only do they all run at the same speed, but their secondary windings at any moment are in the same position in relation to the rotating magnetic fields set up by the primary windings except during acceleration of the motors by the second method mentioned above. The machines, of course, do not run at the synchronous speed corresponding to the supply frequency since the machines are of the asynchronous or induction type.

As will be understood from the foregoing it has until now, when the above mentioned first method was employed, been difficult, and, in the case of the second method been almost impossible to bring the machines into step and to maintain them in step, and the main object of the present invention is to improve the operation of the system in this respect.

To this end, according to the invention, means are provided for ensuring a low acceleration of the motor or motors up to the speed when they come into step or correspondence with the generator machine. The purpose for this is to avoid a tendency for the motors to overrun, i. e., to run through and pass beyond the speed of the generator up to the normal speed of induction motors running on the main power supply; that is to say, a speed which is less than the synchronous speed by the normal amount of slip. While the motors run thus as pure induction motors there can be no synchronism with the generator.

A number of provisions may be made for keeping the acceleration of the motors low, and any of them may be used alone or in conjunction with others. For example, the rotor of each motor may be provided with a braking arrangement, preferably an eddy-current brake. Another method of reducing the acceleration is to insert reactance coils in the common supply leads to the primary windings of the machines. Another provision for producing the same result is to wind the machines with a number of poles such that the synchronous speed is substantially higher than the speed at which the rotors of the machines rotate when running electrically connected in step.

It should be appreciated that when such means for ensuring a low acceleration are provided, a certain starting impulse is often required in order to start the motors at all, and according to the present invention, this starting impulse may be set up by providing a star-connected ohmic resistance in parallel with the connections between the secondary or rotor windings of the machines. In some cases, especially when reactance coils are inserted in the supply leads to the primary windings, as mentioned above, it is of advantage to provide a further star-connected ohmic resistance connected in parallel with the conductors between the secondary windings. The first or main resistance should be of rather a high value, later to be referred to, and should be kept in circuit during the whole of the starting period and may, in some cases remain connected with advantage after that period has elapsed. On the other hand, the second resistance should have a low value and should be connected only for two or three seconds in order to provide a short, sudden and powerful starting impulse. Each of these resistances may in fact be disconnected automatically, for example by means of a time relay.

In addition to providing these various means for ensuring a low starting acceleration, it is preferable to install motors of ample dimensions, that is, motors of greater size than would be required to provide the necessary margin of power to rotate the kiln or other apparatus. The effect of installing such machines is to improve greatly the ease with which they can be maintained in step with the generator, and to reduce hunting or fluctuations in speed, around the generator speed, and also to reduce any tendency of the motors to leave the synchronous speed and to be pulled up to the speed of an ordinary induction motor connected to the supply.

Figure 2:
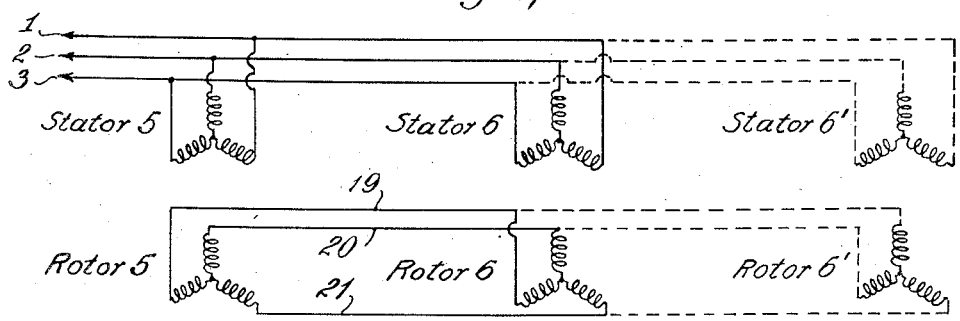

In order that the invention may be clearly understood and readily carried into effect an example of the same will now be described more fully with reference to the accompanying drawing wherein:

Fig. 1 illustrates a self-synchronous system which includes the control features of the present invention; and Fig. 2 represents the fundamental polyphase circuit connections of the system of Fig. 1 without the features of the present invention, and indicates the connection of a plurality of motors.

In the figures, the machines, which in practice are preferably identical, are supplied from a three-phase network 1, 2, 3, intended to be connected by the switch 4 to the source of three-phase power supply 22. The generator 5 with slip rings 7 and a motor 6 with slip rings 8 are both shown with their primary windings connected directly to the power supply conductors 1, 2, 3. The slip rings 7 and 8 are directly connected together by conductors 19, 20, 21, as is more clearly shown in Fig. 2. Generator 5 is driven by direct-current motor 25 which in turn, would in practice be employed to drive a principal machine, such as a rotary kiln of the type described in U. S. Patent 1,903,070 above mentioned. The speed of motor 25 may be controlled by speed regulator 26. If motor 6 is then suitably coupled to drive an auxiliary machine of which the speed is to be a function of the speed of the principal machine, the two machines will be maintained in step at the desired speed ratio.

In starting up the machine, all the primary windings are disconnected, the switch 4 being open, as shown in Fig. 1, but the rotor of the generator machine 5 is already being driven at the required speed by the mechanical drive 23 coupled to direct-current motor 25. The primary windings are then connected to the source of electric power supply by closing the switch 4, which causes the motor or motors 6 to accelerate as asynchronous machines until their rotors pull into step with the rotor of the generator 5. It must also be borne in mind that the load of the motor 6 or of the individual motors may vary, and that where there are two or more motors, they may be unequally loaded.

As mentioned above, it is preferable in practicing the present invention, to employ motors of greater size than otherwise would normally be required. For example, considering the case when the motor 6 is used for driving the slurry feeding device of a cement kiln, in a particular example not including the invention, this required a power of only from 0.1 to 0.2 horsepower. In any event, however, such a small motor is not considered sufficiently robust in practice, and a one-horsepower motor would be regarded as capable of providing an adequate excess of power under normal conditions, that is if the machines are not coupled together in accordance with the present invention. However, I have found that if a type (or size) of motor normally developing 5 horsepower at 750 revolutions per minute is installed, the system has an adequately great capability of keeping the machines in step. In this case, it is assumed that 750 revolutions per minute is the maximum speed of rotation of the kiln motor 25, and half that speed is the minimum. Then if the rotors do not assume the correct positions in relation to the rotating fields set up by their primary windings, the reactance in the rotor windings will cause the current set up in those windings to be almost in phase with the magnetic field. When the primary windings are connected to the electric power source, a torque is set up forcing the rotor of the motor 6, or of the several motors, out of the position which it happens to have into its true position so that it is in step with the generator 5. Then when the generator 5 is started up, the rotors of the motors 6 will be in step with the rotor of the generator 5 at once, and that condition will be maintained as the machines run up to speed. If there is any tendency for the rotors of the motor 6 to vary in speed, equalizing currents will flow in the rotor circuits, and owing to the considerable reactance in those circuits, such equalizing currents will be almost in phase with the rotating magnetic fields set up by the primary windings of the machines so that a force will be developed which will again pull the rotors into step.

It has already been indicated that in accordance with the present invention the system is arranged to reduce the acceleration of the motor or motors 6. Such low acceleration of the motors means that they will slowly approach the speed at which they are in step with the generator 5, with the result that the undesired tendency for the motor 6 to run through the required speed up to the asynchronous speed corresponding to the frequency of supply is materially reduced.

In Fig. 1 several different means are shown for reducing the acceleration of the motors, and these means may be used separately or in conjunction. Thus the motor 6 is shown with its rotor furnished with an eddy-current brake 14 which may consist of a copper disc 15 rotating between the poles of a number of fixed horse-shoe permanent magnets 16. In such a case, the braking torque is proportional to the square of the speed of rotation of the disc 15 so that the brake will exert a powerful braking action at high speeds, whereas it will exert practically no action at low speeds. Furthermore the brake 14 increases the stability of the motor and tends to keep it in step since it prevents hunting which will often cause the machines to pull out of step.

The second means consists of reactance coils 9, 10, 11 inserted in each phase of the common supply leads 1, 2, 3 to the primary windings of the different machines. During starting the current in the coils 9, 10, 11 will be comparatively heavy so that there is a considerable voltage drop in the coils and the voltage on the terminals of the primary windings of the machines is considerably reduced which causes the machines to start up slowly. Under running conditions, however, the current in the coils 9, 10, 11 is small, and therefore the voltage drop in them is only trifling.

Thirdly, the machines are to be assumed to be wound for a number of poles corresponding to a synchronous speed which is substantially higher than the upper limit of the speed range within which the speed of the rotors is required to vary. This causes a reduction in the starting torque because the currents induced in the rotor by the rotating field are of relatively high frequency so that the effect of the reactance in this circuit is increased relatively to the effect of the resistance, causing the power factor of their currents to be lowered and the torque correspondingly reduced. For this purpose the number of poles should be selected such that the frequency of the current in the rotors when the motor has pulled into step should not be less than about one-third of the frequency of the supply current, so that the torque exerted by the induced currents is relatively small and there is a correspondingly negligible tendency for the motor to be pulled through this synchronous speed to run as an induction motor.

As above indicated, star-connected ohmic resistances may be connected in parallel with the secondary connections 19, 20, 21 between the slip rings of the machines. In Fig. 1 one such resistance 12 is shown, arranged to be connected and disconnected by means of a switch 13. The purpose of this resistance is to provide for currents flowing during the starting period in the rotor circuits and of the frequency of the supply, and also having a suitably high power component, in order that an accelerating torque may be set up in the motor 6, or in each motor connected in parallel therewith, the action being similar to that which occurs when an ordinary slip ring induction motor is started up by means of a resistance starter in the rotor circuit. If such a resistance is not provided, when the attempt is made to start up the machines according to the second method referred to, a torque-varying irregularly both in magnitude and sense might often be set up and prevent the motors starting. At the moment of starting, the frequency of the current in the primary windings is equal to the supply frequency which is $$\frac{p.n_1}{60} \quad (1)$$

where $p$ is the number of pairs of poles for which the primary is wound, and $n_1$ is the synchronous speed corresponding to the frequency of the supply current.

The frequency of the currents set up in the secondary or rotor of the generator will be $$\frac{p.(n_1-n_2)}{60} \quad (2)$$

where $n_2$ is the speed in revolutions per minute of the generator shaft 23. Since the rotors of the motors are directly connected to the rotor of the generator, this same frequency appears in the rotors of the motors, and it is obvious that, generally speaking, it is not possible to set up any accelerating torque in the motors by reason of the difference in frequency between the rotor currents and the magnetic fields set up by the stator windings. However, by providing the resistance 12 connected during the starting period, additional alternating power currents of the frequency of the supply flow in the rotors, and consequently a supplementary accelerating torque is set up and a resultant torque which is pulsating, but while including impulses tending to turn the rotor in both directions, the impulses acting in one direction are greater than those acting in the other direction so that there is a resultant torque causing the motor 6 to start up as an induction motor.

It has been found by experience that the torque thus set up by the resistance 12 should not be greater than that necessary to ensure a good start, as otherwise there may be a risk of the motors running through the desired speed and going up to the normal speed for an asynchronous induction motor, that is, the synchronous speed corresponding to the supply frequency less the slip. For the same reason it is necessary that the effort maintaining the motors in step should be of such a value that the motors will remain in step even when running light.

From what is said above, it will be appreciated that, in some cases the resistance 12 is maintained in circuit not only during the starting period but also under running conditions to maintain the machines stably in step. The resistance 12 should be of rather a high value compared to that of the secondary windings, for example, in the case of the 5 horsepower motor already referred to, it may have a value of 70 ohms.

In some cases, particularly when the reactance coils 9, 10, 11 are employed in order to reduce the acceleration, it is found to be advantageous to provide a further star-connected ohmic resistance 17 of low value for example, of the order of a moderate multiple of that of the secondary windings, and connected in parallel with the conductors 19, 20, 21. This resistance is connected and disconnected by the switch 18, and in the case mentioned above may have a value of, say, six ohms. The purpose of the resistance 17 is to give a sudden and powerful starting impulse for quite a short period. Thus this resistance should only be connected for two or three seconds, and may also be disconnected automatically by means of an automatic time relay 24 which may be set into operation through control 27 by the closing of switch 4. Relay 24 may be arranged to operate either or both of switches 13 and 18, as shown.

The dimensions of the reactance coils 9, 10, 11 should be such that they prevent the motors from starting at all until the ohmic resistance 17 has been connected by the closing of switch 18.

In the foregoing examples the rotors of the machine have been described as connected together and the stators as connected to the power source. As is generally known, and as is apparent from Fig. 2, the same results can be secured with these connections interchanged, i. e., with the stators connected together and the rotors connected to the power source, in which event the resistances 12, 17 of this invention would be connected to the stators instead of to the rotors. The claims are therefore to be interpreted with this equivalency in mind.

What I claim is:

1. A system for starting up and bringing into synchronism two or more three-phase electrical machines of the asynchronous type having star-connected rotor and stator windings, a power switch for connecting the stator windings in parallel to a source of three-phase electrical current, three star-connection leads between said rotor windings, one of said machines being coupled to a controllable speed driving motor and being adapted to operate as an alternating current generator, and the remaining machines being adapted to operate as alternating current motors, a first means for connecting in star-connection to the three connection leads between said rotors substantially equal ohmic resistances of a value of the order of a moderate multiple of the resistance of said rotor windings, a second means for connecting in star-connection to said three connection leads substantially equal ohmic resistances of a value higher than the first named resistances, and a time relay coupled to said power switch and to said first and second connecting means and actuated in response to the closing of said power switch to connect said first named resistances for a short period and said higher resistances for a longer period, whereby to attain synchronous operation of said machines.

2. A system for starting up and bring into synchronism two or more polyphase electrical machines of the asynchronous type having rotor and stator windings, the stator windings being arranged for connection in parallel with a source of polyphase electrical current and the rotor windings being connected in parallel with each other, one of said machines being coupled to a driving motor and being adapted to operate as an alternating current generator, and the remaining machines being adapted to operate as alternating current motors, means for connecting substantially equal ohmic resistances across the phases of the connections between said rotors at least during the starting of said alternating current motors to create an accelerating torque, and a reactance connected in series with each phase of said electrical source to limit the starting current considerably more than the running current whereby to attain synchronous operation of said machines.

3. A system for starting up and bringing into synchronism two or more polyphase electrical machines of the asynchronous type having rotor and stator windings, the stator windings being arranged for connection in parallel with a source of polyphase electrical current and the rotor windings being connected in parallel with each other, one of said machines being adapted to operate as an alternating current generator and another of said machines being adapted to operate as an alternating current motor, and means for connecting in star-connection to said rotor windings at least during the starting period of said motor substantially equal ohmic resistances of a value higher than the resistances of said rotor windings, said machines being wound for a number of poles such that the frequency of the current in the rotors when the motor has pulled into step should not be less than about one-third the frequency of said current source, whereby upon connection to said electrical source the rotor of said motor accelerates slowly to attain synchronous operation with the rotor of said generator.

4. A system for starting up and bringing into synchronism two or more polyphase electrical machines of the asynchronous type having rotor and stator windings, the stator windings being arranged for connection in parallel with a source of polyphase electrical current and the rotor windings being connected in parallel with each other, one of said machines being coupled to a driving motor and being adapted to operate as an alternating current generator, and the remaining machines being adapted to operate as alternating current motors, means for connecting substantially equal ohmic resistances, each of a resistance value of the order of a moderate multiple of that of the rotor windings, across the phases of the connections between said rotors only during a part of the starting of said motors, and means for connecting substantially equal ohmic resistances, each of a resistance value higher than that of said first named resistances, across the phases of the connections between said rotors, at least during the entire starting period of said motors.

JOAKIM ULRIK FREDERIK ANDERSEN.